United States Patent
Ryals et al.

(10) Patent No.: US 6,861,583 B1
(45) Date of Patent: Mar. 1, 2005

(54) WIRE PROTECTOR AND RELATED METHODS

(75) Inventors: Steven Ryals, Pinson, AL (US); Wilson Ryals, Trussville, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/751,050

(22) Filed: Jan. 2, 2004

(51) Int. Cl.⁷ ............................................ H02G 3/04
(52) U.S. Cl. .................. 174/48; 174/41; 174/94 R; 174/97; 174/68.1; 52/220.7; 439/120
(58) Field of Search ................... 174/48, 41, 94 R, 174/68.1, 97, 95; 439/207, 120, 212, 216, 209; 52/220.7

(56) References Cited

U.S. PATENT DOCUMENTS 2,812,380 A * 11/1957 Lehrke ........................ 174/41
3,408,455 A * 10/1968 Dannes ...................... 174/94 R

* cited by examiner

Primary Examiner—Dhiru R. Patel
(74) Attorney, Agent, or Firm—Myers Bigel Sibley & Sajovec

(57) ABSTRACT

A wire protector for protecting a wire during mounting of the wire on a mounting surface includes a retaining member configured to engage the wire. The retaining member includes a top portion and first and second arms extending generally perpendicularly from the top portion. Junctures between the top portion and the first and second arms are arcuate to engage the wire therein. At least one securing member is connected with the retaining member and adapted to position the retaining member on the surface.

28 Claims, 5 Drawing Sheets

WIRE PROTECTOR AND RELATED METHODS

FIELD OF THE INVENTION

The present invention relates generally to the installation of electrical wire and, more particularly, to devices for protecting electrical wire from damage when the wire is stapled to a surface.

BACKGROUND OF THE INVENTION

Various types of wire can be secured to a surface as part of installation. For example, conventional wiring for use with telephone, sound, doorbell and thermostat systems is secured to a surface, such as a wall or floor surface, using a staple. These wires typically have a plastic sheath that protects the interior electrical wire and electrically isolates the wire from the outside environment. The staple fits over the wire and into the surface to secure the wire. However, staples used in this configuration may puncture the plastic sheath around the wire and damage the electrical contacts inside the sheath. Damage to the sheath may adversely affect the performance of the wire. Electrical connections may be broken and a damaged wire may require replacement. Moreover, damage to the sheath may not cause immediate failure of the wire, but can cause subsequent failures due to wear on a poorly protected wire over time. It may be difficult to locate connection failures in a system. These and other problems can increase the costs of electrical wire installation and materials.

SUMMARY OF THE INVENTION

In view of the above discussion, a wire protector is provided for protecting a wire during mounting of the wire on a mounting surface. In some embodiments, the wire protector includes a retaining member configured to engage the wire. The retaining member includes a top portion and first and second arms extending generally perpendicularly from the top portion. Junctures between the top portion and the first and second arms are arcuate to engage the wire therein. At least one securing member is connected with the retaining member and adapted to position the retaining member on the surface. In this configuration, the wire can be engaged between the first and second arms and positioned on the surface. The protector can temporarily secure the wire on the surface. The protector can also shield the wire from a staple positioned over the wire protector and the wire to secure the wire. In this configuration, damage to the wire during installation on a surface may be reduced and electrical contacts can be preserved.

In some embodiments, the securing member includes at least one pointed tip extending from a lower edge thereof and configured to grip the surface. The securing member may include a plurality of pointed tips extending from the lower edge thereof.

In some embodiments, the retaining member includes a generally flat surface configured to extend a distance along the length of the wire when mounted on the mounting surface. The distance can be between about 0.2 and about 0.5 inches. The protectors according to embodiments of the invention can be formed of a polymeric material and/or formed as a unitary member.

In some embodiments, a mounted wire assembly is provided. The wire mounted assembly includes a wire resting against a surface, a protector overlying the wire, and a staple overlying the protector such that the staple secures the wire and the protector to the surface. The protector includes a retaining member configured to engage the wire. The retaining member includes a top portion and first and second arms extending generally perpendicularly from the top portion. The protector further includes at least one securing member connected with the retaining member and adapted to position the retaining member on a surface.

In further embodiments, methods for protecting a wire during mounting of the wire on a mounting surface are provided. A protector is positioned over a wire. The protector includes a retaining member configured to engage the wire. The retaining member includes a top portion and first and second arms extending generally perpendicularly from the top portion. The protector further includes at least one securing member connected with the retaining member and adapted to position the retaining member on a surface. The protector is secured to the underlying surface with the securing member. A staple is applied to the surface over the protector. The staple secures the wire and the protector to the surface.

DETAILED DESCRIPTION OF THE INVENTION

Figure 1:
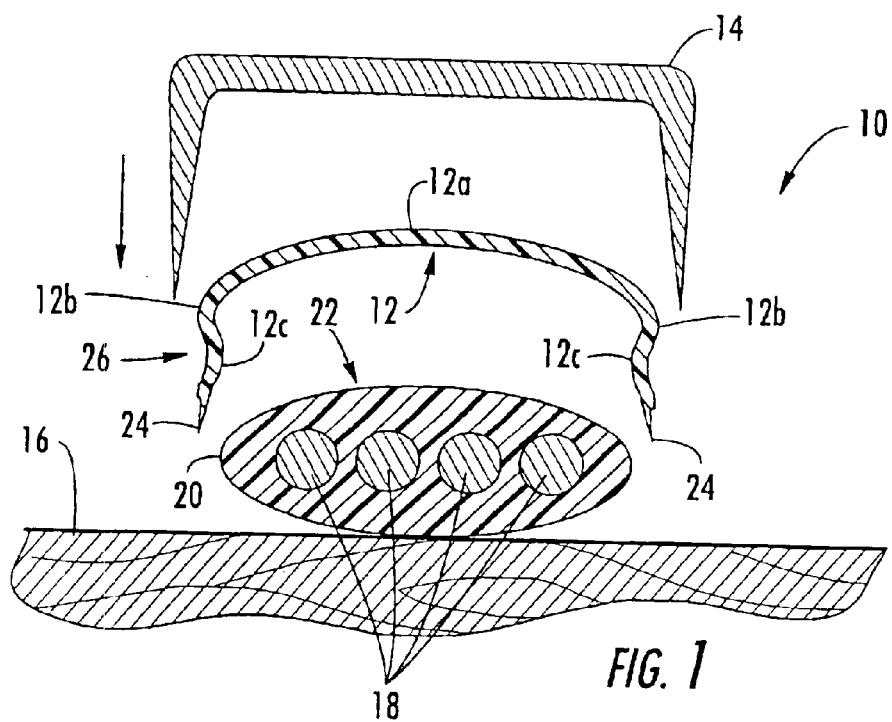
FIG. 1 is a cross sectional view of a wire assembly including a wire, a wire protector, and a staple according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

The present invention relates to wire protector devices that can be used to protect a wire during mounting of the wire on a surface. Wire protectors according to certain embodiments of the invention may be manufactured economically from a single piece of material using various inexpensive materials and known manufacturing techniques including injection molding.

For ease of discussion, the embodiments described herein are shown with reference to a flat wire, such as a telephone or communication wire. However, wire protectors according to embodiments of the invention may be used in connection with any wire or cable, including wire or cable for sound systems, doorbell ringers, thermostat wires, coaxial cables, and the like.

A wire assembly 10 according to embodiments of the present invention is illustrated in FIG. 1. The wire assembly 10 includes a wire 22, a wire protector 26, and a staple 14, and is placed on a surface 16. The wire 22 includes a sheath 20 that encases one or more electrical conductors 18. The sheath 20 can be made of plastic or any suitable material for protecting the conductors 18, and can include material between the conductors 18 to electrically isolate the conductors 18 from one another. The wire protector 26 is configured to overlie the wire 22 so as to reduce the risk of puncturing the sheath 20 when the staple 14 secures the wire protector 26 and the wire 22 to the surface 16.

As illustrated in FIG. 1, the wire protector 26 includes a retaining member 12 for retaining the wire 22 and a securing member, such as teeth 24, adapted to position the retaining member 12 on the surface 16. In particular, the retaining member 12 includes a top portion 12a and two arms 12c that extend in a generally perpendicular direction from the top portion 12a. The junctures 12b between the top portion 12a and the two arms 12c are arcuate to engage the wire therein. The teeth 24 can include a pointed tip extending from the lower edge of the wire protector 26 to grip the surface 16 when the wire protector 26 is placed on the surface 16 and over the wire 22.

In this configuration, the wire protector 26 can protect the wire 22 from damage and reduce the likelihood that the staple 14 may puncture the wire 22. For example, the wire protector 26 can protect the sheath 20 from being punctured by the staple 14 during installation. The wire protector 26 can also secure the wire 22 in position on the surface 16 temporarily prior to installation of the staple 14 over the wire protector 26 and the wire 22.

Figure 2:
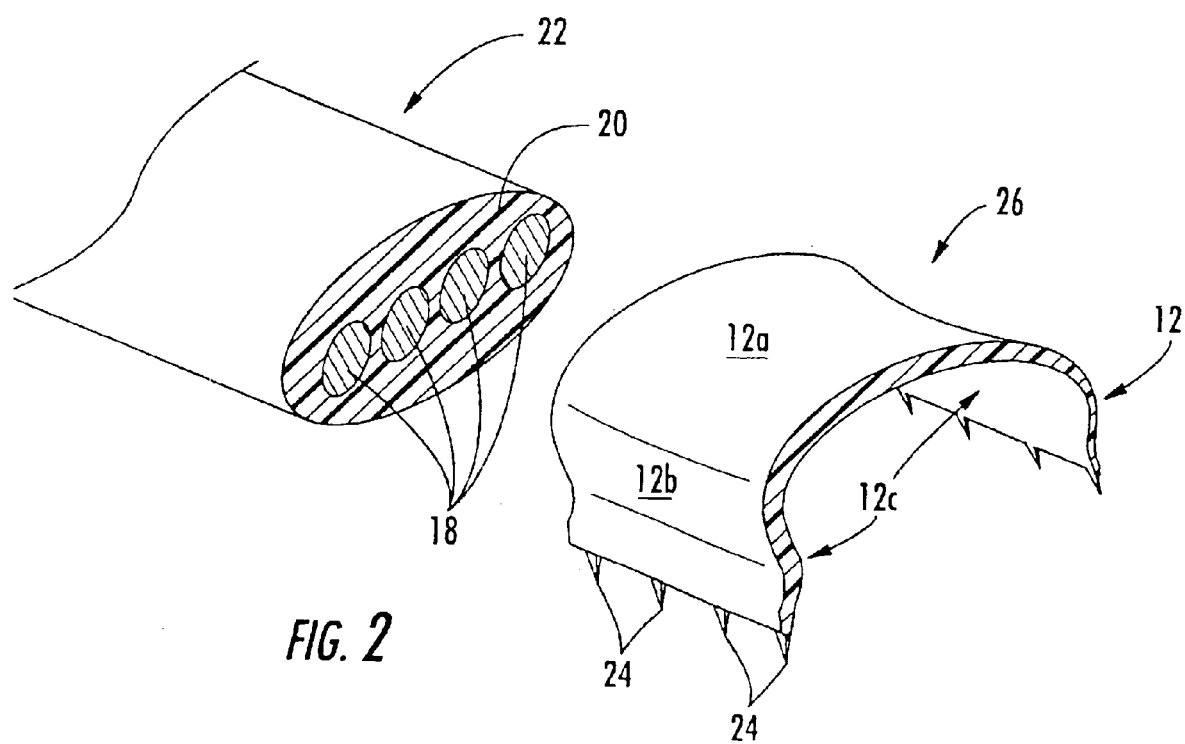
FIG. 2 is a perspective view of the wire and wire protector of FIG. 1.
Figure 3:
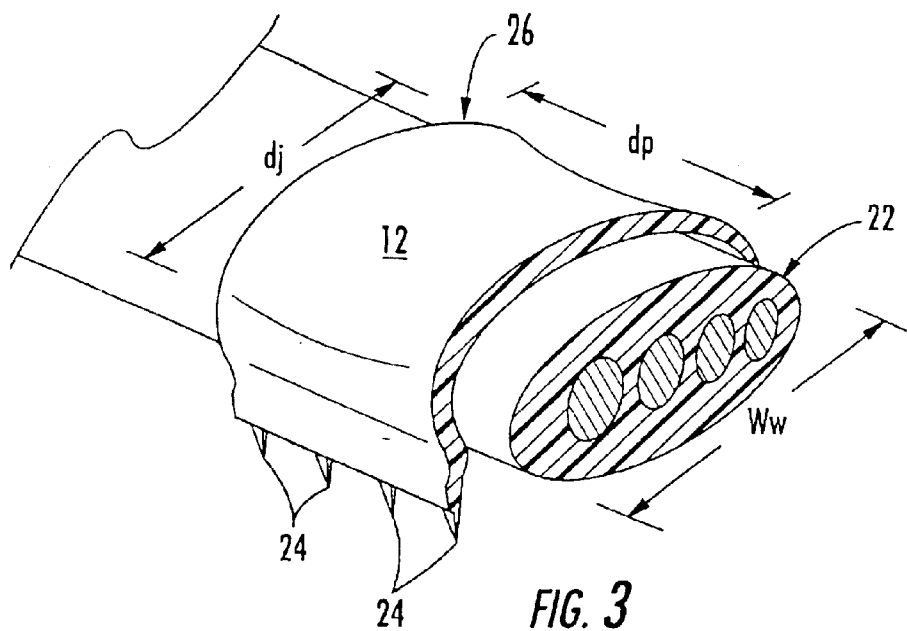
FIG. 3 illustrates the wire protector of FIG. 1 installed on a wire.

As shown in FIGS. 2 and 3, the wire protector 26 is configured to fit over the wire 22. In particular, the wire 22 can be placed adjacent the top portion 12a of the retaining member 12 so that the retaining member 12 holds the wire 22 therein. More specifically, the arcuate shape of the junctures 12b between the top portion 12a and the arms 12c is configured to hold the wire 22 therein. As shown in FIG. 3, the retaining member 12 can grip the wire 22 snugly so that a substantial portion of the retaining member 12 is in contact with the surface of the wire 22. Alternatively, the retaining member 12 can grip the wire 22 on the sides of the wire 22, e.g., at junctures 12b, and the top portion 12a of the retaining member 12 may not be in contact with the wire 22. In some embodiments, the wire protector 26 is formed from a material that is flexible enough to deflect to engage the wire 12 and resilient enough to recover so that the retaining member 12 snaps over the wire 22 to securely hold the wire 22 in between the junctures 12b and the arms 12c of the retaining member 12. The wire protector 26 can be formed of a polymeric material and/or as a single unitary member.

Referring to FIG. 3, the wire 22 has a width $w_w$ of between about 0.25 to about 0.75 inches. In some embodiments, the wire 22 has a width $w_w$ of about 0.5 inches. The wire protector 26 has a distance $d_j$ between the junctures that is large enough to accommodate the wire width $w_w$, such as between about 0.25 to about 1.0 inches. For example, if the wire width $w_w$ is 0.5 inches, then the juncture distance $d_j$ can be between about 0.5 inches and about 0.7 inches.

As illustrated in FIG. 3, the retaining member 12 of the wire protector 26 has a generally flat surface that extends a distance $d_p$ along the length of the wire. The distance $d_p$ should be sufficient to protect the wire 22 during installation of a staple. The distance $d_p$ can vary based on the width of the staple that is installed over the wire protector 26 so that the distance $d_p$ is at least as long or longer than the width of the staple. In some embodiments, the distance $d_p$ is between about 0.2 and about 0.75 inches, or about 0.5 inches. The thickness of the retaining member can be between about 0.125 inches and about 0.25 inches or more.

Figure 4:
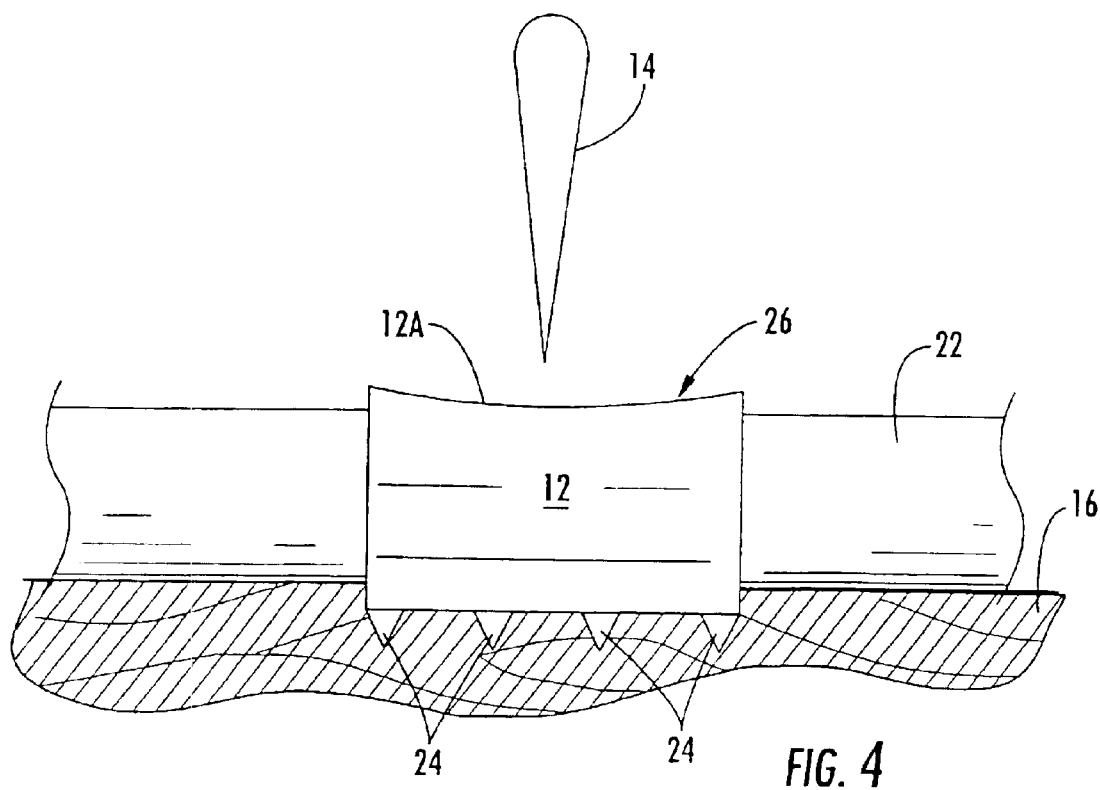
FIG. 4 is a side view of the wire assembly of FIG. 1.

As shown in FIG. 4, the wire protector 26 can include teeth 24 for gripping the surface 16. The teeth 24 can penetrate the surface 16 so that the wire protector 26 is secured to the surface 16. In this configuration, the wire protector 26 can secure the wire 22 to the surface 16 temporarily prior to the installation of the staple 14. As shown in FIG. 4, the top portion 12a of the retaining member 12 is curved so as to guide the staple 14 to a perpendicular installed position with respect to the surface 16. For example, the staple 14 can be installed using a hammer. If the force of the hammer pushes the staple 14 at an angle with respect to the perpendicular installed position, the curved shape of the top portion 12a can guide the staple 14 as it enters the surface 16 to a more perpendicular position.

Figure 5:
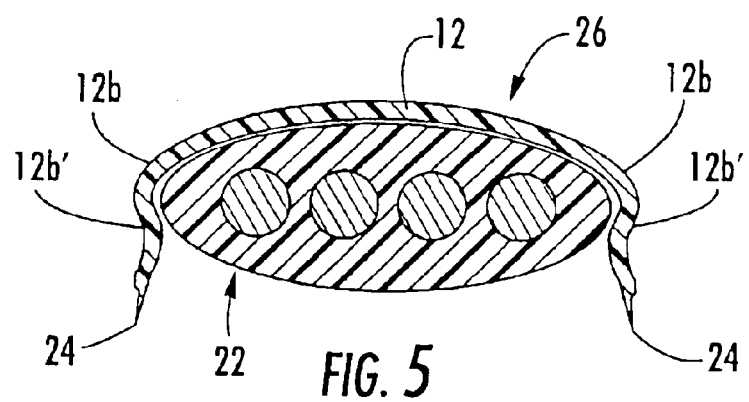
FIGS. 5, 6 and 7 are cross sectional views of the wire assembly of FIG. 1 illustrating the wire protector installed on the wire (FIG. 5), the wire protector securing the wire to a surface prior to installation of the staple (FIG. 6), and the staple installed over the wire protector and the wire (FIG. 7).
Figure 6:
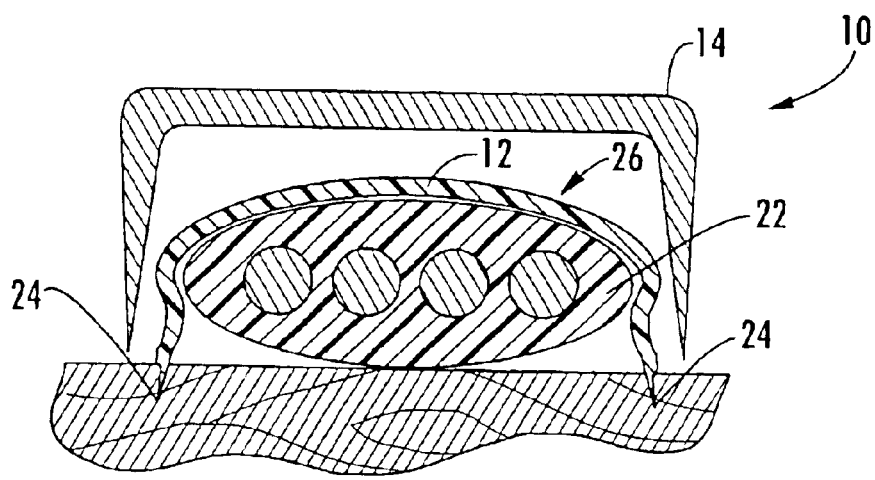
Figure 10:
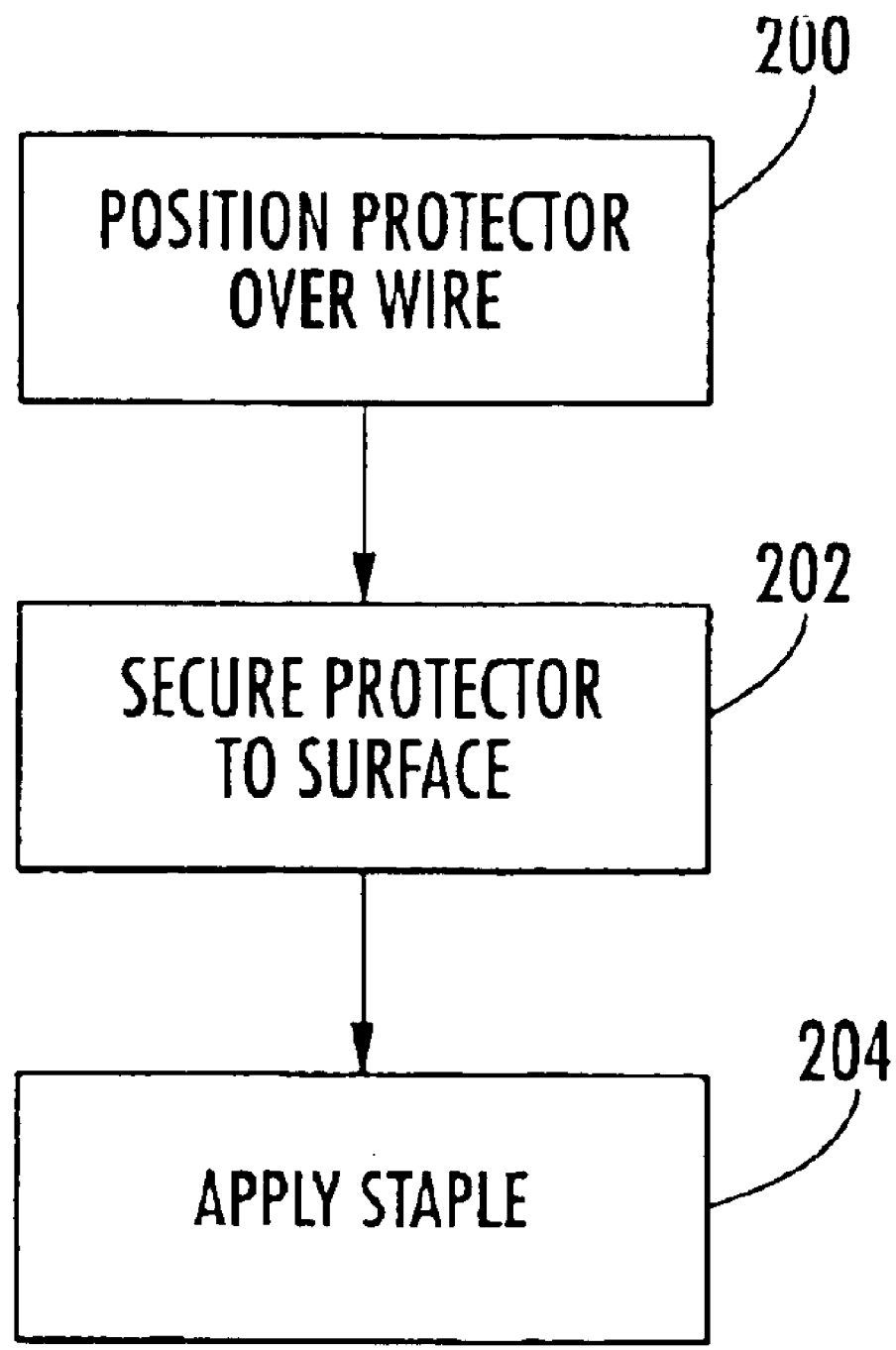
FIG. 10 is a flow chart illustrating operations according to embodiments of the present invention.

FIGS. 5–7 and 10 illustrate methods and configurations for protecting a wire during mounting of the wire on a mounting surface. Referring to FIG. 10, a wire protector can be positioned over a wire (Block 200). For example, the wire protector can be the wire protector 26 shown in FIG. 5 with the retaining member 12 configured to engage the wire 22. However, other wire protectors and alternative configurations can be used. As illustrated in FIG. 5, the retaining member engages the wire between the arcuate junctures 12b so that the junctures 12b and an undercut portion 12b' thereof grip the wire 22. With reference to FIG. 10, the wire protector can be secured on a surface (Block 202), such as the surface 16 as shown in FIG. 6 using teeth 24 or another securing member. A staple is then applied to the surface over the protector so that the staple secures the wire and the protector to the surface (Block 204). The staple can be the staple 14 shown in FIG. 7 securing the wire 22 and the protector 26 to the surface 16.

Figure 7:
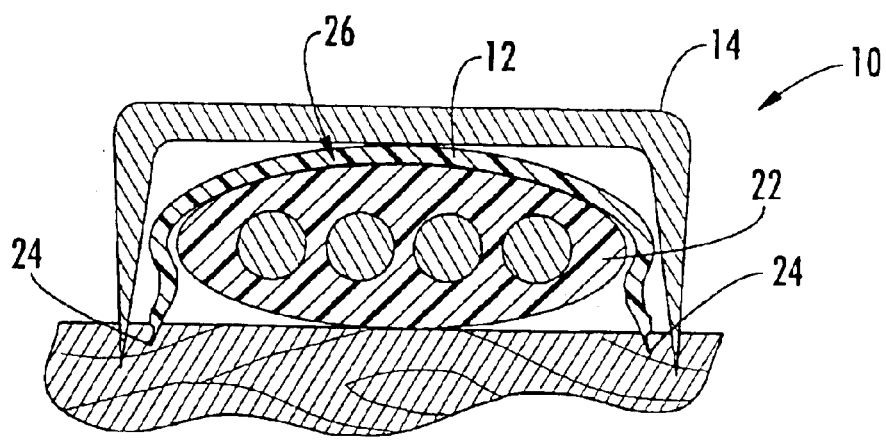
Figure 8:
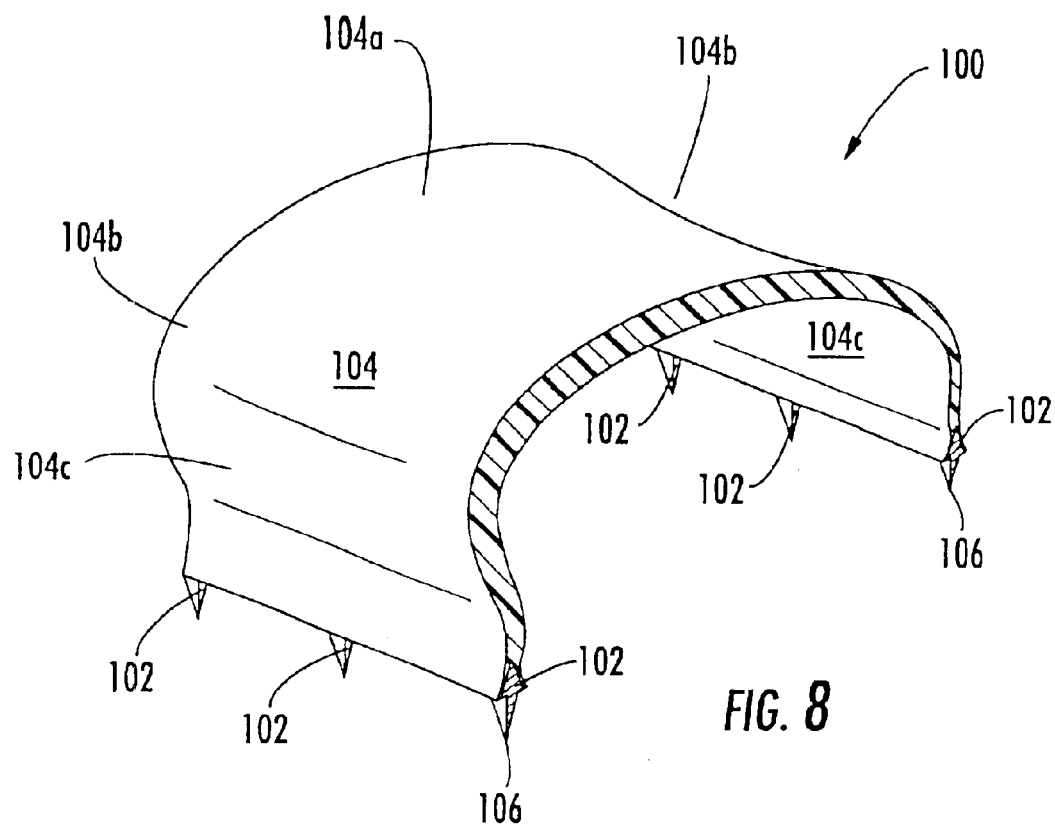
FIG. 8 is a perspective view of a wire protector according to further embodiments of the present invention.
Figure 9:
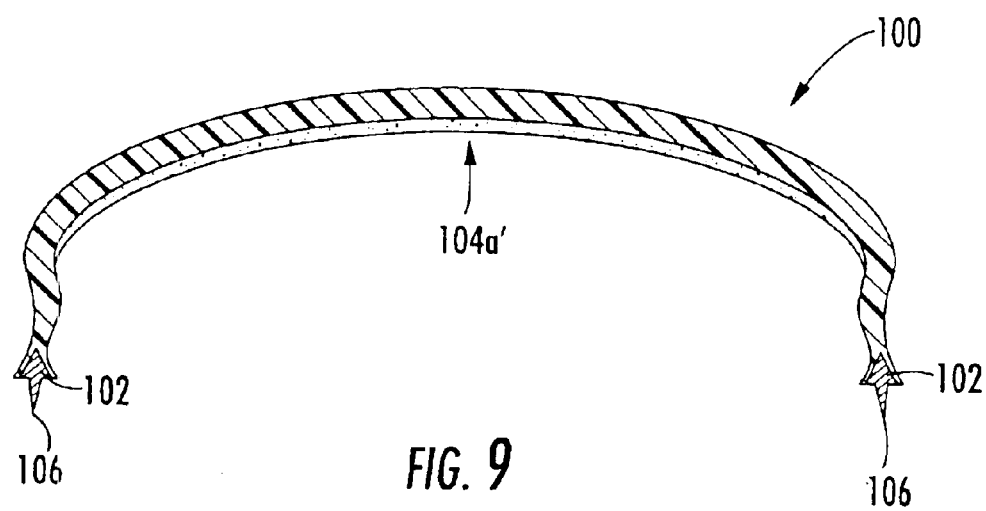
FIG. 9 is a cross sectional view of the wire protector of FIG. 8.

Although the method steps illustrated in FIG. 10 are discussed above with respect to the wire protector 26 and the illustrated steps shown in FIGS. 5–7, the steps of FIG. 10 can be used with other configurations of wire protectors, wires, staples and the like. For example, the steps illustrated in FIG. 10 can be employed using an alternative wire protector 110 as shown in FIGS. 8–9. The wire protector 110 includes a retaining member 104 configured to engage a wire and a securing member (not shown), such as a tack 102, for positioning the retaining member 104 on a surface.

The retaining member 104 includes a top portion 104a and two arms 104c extending generally perpendicularly from the top portion 104a and junctures 104b. As illustrated, the junctures 104b are arcuate in shape to engage the wire therein. However, other shapes can be used. For example, the junctures 104b can be modified to form a corner forming a ninety degree angle between the top portion 104a and the arms 104c. In some embodiments, the top portion 104a has a bottom surface 104a' that has an adhesive thereon. An adhesive on the bottom surface 104a' can be used to secure a wire in the retaining member 104 and may be used instead of or in addition to the arcuate junctures 104b for securing a wire therein.

The tack 102 includes a point 106 for securing the wire protector 100 to a surface. The tack 102 can be formed of the same material or a different material from the retaining member 104. In some embodiments, the tack 102 is formed of a metal material, such as aluminum or steel, and the retaining member 104 is formed of a polymeric material. In other embodiments, the tack 102 and the retaining member 104 are both formed of a polymeric material or both formed of a metal.

The wire protectors according to embodiments of the present invention can be manufactured from various materials using various processes understood by those of skill in the art. Exemplary materials include, but are not limited to, polymeric materials such as polyethylene and polypropylene, and exemplary manufacturing methods include, but are not limited to, injection molding.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A wire protector for protecting a wire during mounting of the wire on a mounting surface, the protector comprising:
   a retaining member configured to engage the wire, the retaining member comprising a top portion and first and second arms extending generally perpendicularly from the top portion, wherein junctures between the top portion and the first and second arms are arcuate to engage the wire therein; and
   at least one securing member connected with the retaining member and adapted to position the retaining member on a surface;
   wherein the securing member comprises at least one pointed tip extending from a lower edge thereof and configured to grip the surface.

2. The wire protector of claim 1, wherein a first distance between the junctures is between about 0.5 inches and 0.7 inches.

3. The wire protector of claim 1, wherein the securing member comprises a plurality of pointed tips extending from the lower edge thereof.

4. The wire protector of claim 1, wherein the retaining member comprises a generally flat surface configured to extend a second distance along the length of the wire when mounted on the mounting surface.

5. The wire protector of claim 4, wherein the second distance is between about 0.2 and about 0.5 inches.

6. The wire protector of claim 1, wherein the protector is formed of a polymeric material.

7. The wire protector of claim 1, wherein the protector is formed as a unitary member.

8. The wire protector of claim 1, further comprising an adhesive on a side of the retaining member positioned to adhere the retaining member to the wire.

9. A mounted wire assembly, comprising:
   a wire resting against a surface;
   a protector overlying the wire, the protector comprising:
      a retaining member configured to engage the wire, the retaining member comprising a top portion and first and second arms extending generally perpendicularly from the top portion; and
      at least one securing member connected with the retaining member and adapted to position the retaining member on a surface; and
   a staple overlying the protector, the staple securing the wire and the protector to the surface.

10. The wire assembly of claim 9, wherein junctures between the top portion and the first and second arms are arcuate to engage the wire therein.

11. The wire assembly of claim 10, wherein a first distance between the junctures is between about 0.5 inches and 0.7 inches.

12. The wire assembly of claim 9, wherein the securing member comprises at least one pointed tip extending from a lower edge thereof and configured to grip the surface.

13. The wire assembly of claim 12, wherein the securing member comprises a plurality of pointed tips extending from the lower edge thereof.

14. The wire assembly of claim 9, wherein the retaining member comprises a generally flat surface configured to extend a second distance along the length of the wire when mounted on the mounting surface.

15. The wire assembly of claim 14, wherein the second distance is between about 0.2 and about 0.3 inches.

16. The wire assembly of claim 9, wherein the protector is formed of a polymeric material.

17. The wire assembly of claim 9, wherein the protector is formed as a unitary member.

18. The wire assembly of claim 9, wherein the protector further comprising an adhesive on a side of the retaining member between the retaining member and the wire that adheres the retaining member to the wire.

19. A method for protecting a wire during mounting of the wire on a mounting surface, the method comprising:
    positioning a protector over a wire, the protector comprising:
       a retaining member configured to engage the wire, the retaining member comprising a top portion and first and second arms extending generally perpendicularly from the top portion; and
       at least one securing member connected with the retaining member and adapted to position the retaining member on a surface; and
    securing the protector to the underlying surface with the securing member;
    applying a staple to the surface over the protector, the staple securing the wire and the protector to the surface.

20. The method of claim 19, further comprising engaging the wire in arcuate junctures between the top portion and the first and second arms of the protector.

21. The method of claim 19, wherein a first distance between the junctures is between about 0.5 inches and 0.7 inches.

22. The method of claim 19, wherein the securing member comprises at least one pointed tip extending from a lower edge thereof and configured to grip the surface.

23. The method of claim 22, wherein the securing member comprises a plurality of pointed tips extending from the lower edge thereof.

24. The method of claim 19, wherein the retaining member comprises a generally flat surface configured to extend a second distance along the length of the wire when mounted on the mounting surface.

25. The method of claim 24, wherein the second distance is between about 0.2 and about 0.3 inches.

26. The method of claim 19, wherein the protector is formed of a polymeric material.

27. The method of claim 19, wherein the protector is formed as a unitary member.

28. The method of claim 19, further comprising applying an adhesive on a side of the retaining member positioned to adhere the retaining member to the wire.

* * * * *